(12) United States Patent
Yamaguchi et al.

(10) Patent No.: US 9,218,089 B2
(45) Date of Patent: Dec. 22, 2015

(54) NOISE CANCELLATION ELECTRODE DRIVING FOR TOUCH PANEL

(71) Applicants: KABUSHIKI KAISHA TOKAI RIKA DENKI SEISAKUSHO, Aichi (JP); SMK CORPORATION, Tokyo (JP)

(72) Inventors: Syogo Yamaguchi, Aichi (JP); Osamu Yoshikawa, Tokyo (JP)

(73) Assignees: KABUSHIKI KAISHA TOKAI RIKA DENKI SEISAKUSHO, Aichi (JP); SMK CORPORATION, Tokyo (JP)

( * ) Notice: Subject to any disclaimer, the term of this patent is extended or adjusted under 35 U.S.C. 154(b) by 53 days.

(21) Appl. No.: 14/136,159

(22) Filed: Dec. 20, 2013

(65) Prior Publication Data
US 2014/0192015 A1 Jul. 10, 2014

(30) Foreign Application Priority Data

Jan. 7, 2013 (JP) ................................. 2013-000596

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 2203/04107* (2013.01)

(58) Field of Classification Search
CPC ..... G06F 3/041; G06F 3/0418; G06F 3/0416; G06F 3/044; G06F 2203/04112; G06F 2203/04104
See application file for complete search history.

(56) References Cited

U.S. PATENT DOCUMENTS

| 2002/0135568 | A1* | 9/2002 | Chen ..................... G06F 3/0418 345/173 |
| 2009/0189867 | A1* | 7/2009 | Krah ....................... G06F 3/044 345/173 |
| 2010/0066692 | A1* | 3/2010 | Noguchi et al. ............. 345/173 |
| 2011/0018560 | A1 | 1/2011 | Kurashima |
| 2011/0095991 | A1* | 4/2011 | Philipp et al. ................. 345/173 |
| 2012/0013563 | A1 | 1/2012 | Chou et al. |
| 2014/0028626 | A1* | 1/2014 | Maeda .................. G06F 3/0416 345/174 |

FOREIGN PATENT DOCUMENTS

| JP | 2010-009321 | 1/2010 |
| JP | 2011-170784 | 9/2011 |
| JP | WO 2012141139 A1 * | 10/2012 ............ G06F 3/0416 |

OTHER PUBLICATIONS

European Search report in European Patent Application No. 13199280 2, mail date is Jan. 29, 2015.

* cited by examiner

*Primary Examiner* — Nalini Mummalaneni
(74) *Attorney, Agent, or Firm* — Greenblum & Bernstein, P.L.C.

(57) ABSTRACT

A touch input device includes a touch panel, a controller, and a cancellation electrode. The touch panel includes a sensor pattern and an operation surface arranged above the sensor pattern. The sensor pattern includes first electrodes and second electrodes insulated from one another and arranged in a grid. The controller applies a drive pulse signal to the sensor pattern and detects a touch location where the operation surface of the touch panel is touched based on changes in capacitance of the sensor pattern. A cancellation pulse signal is applied to the cancellation electrode during application of the drive pulse signal. The cancellation pulse signal has a phase inverted from that of the drive pulse signal.

3 Claims, 4 Drawing Sheets

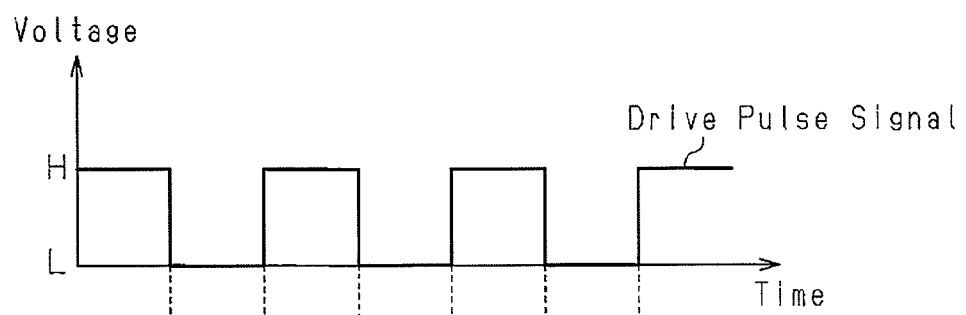
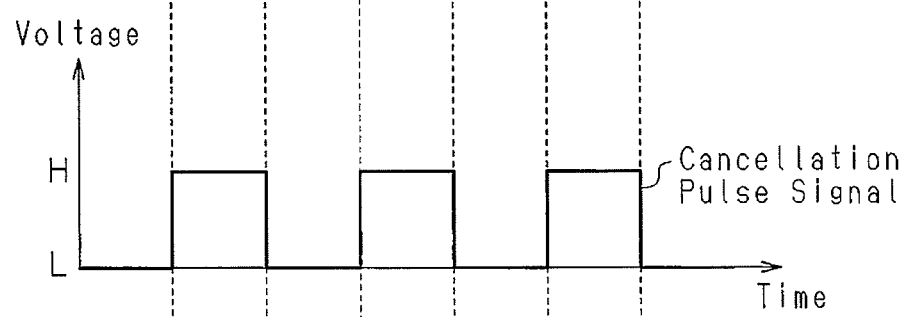
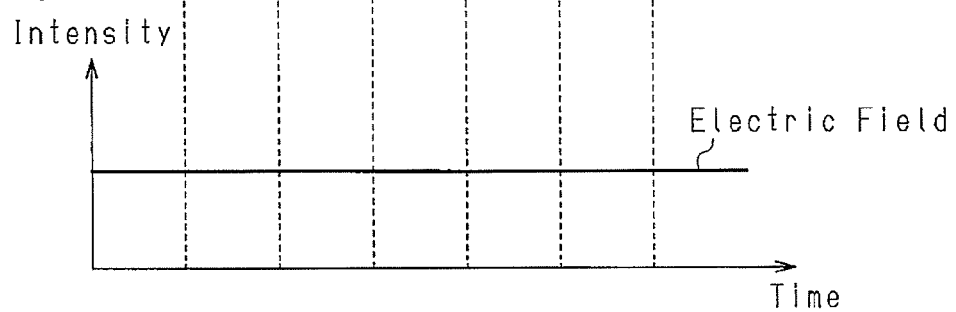

NOISE CANCELLATION ELECTRODE DRIVING FOR TOUCH PANEL

CROSS-REFERENCE TO RELATED APPLICATIONS

This application is based upon and claims the benefit of priority from prior Japanese Patent Application No. 2013-000596, filed on Jan. 7, 2013, the entire contents of which are incorporated herein by reference.

BACKGROUND OF THE INVENTION

The present invention relates to a touch type input device.

A known touch type input device shows a pointer or the like on a display when a touch panel is touched (refer to, for example, Japanese Laid-Open Patent Publication No. 2010-9321). A user touches an operation surface defined on the touch panel of the touch type input device and, for example, selects one of a plurality of functional items shown on the display to open a desired image on the display or activate an accessory.

Such a touch panel may be of a projected capacitance type that includes a sensor pattern of first electrodes and second electrodes arranged in a grid. Touching of the touch panel is detected from the capacitance of a capacitor formed at each intersection of the first and second electrodes (refer to, for example, Japanese Laid-Open Patent Publication No. 2011-170784). In detail, in a projected capacitance type touch panel, a controller applies a cyclic drive pulse signal (voltage signal) to the sensor pattern. The controller is configured to detect a touch location where the operation surface was touched based on changes in the capacitance of the capacitors when a conductor, such as a finger, approaches or contacts the operation surface of the touch panel.

During operation of the touch panel described above, an electric field is formed outside the touch panel (touch type input device) in correspondence with the drive pulse applied to the sensor pattern. The size of the drive pulse signal cyclically changes in accordance with the frequency of the drive pulse signal. This cyclically changes the electric field formed outside the touch panel. The changes in the electric field produces radiation noise that may affect the operation of any of a various devices arranged near the touch panel.

A low-pass filter may be used to eliminate high-frequency components from the drive pulse signal and decrease changes in the electric field. In this case, however, the low-pass filter would also decrease the changes in the capacitance of the capacitors and thus lower the touching detection accuracy. Further, the frequency of the drive pulse signal may be set at a value that avoids interference with the frequency of devices arranged around the touch panel. However, when a relatively low frequency is set for the drive pulse signal, the interval at which voltage is applied to the sensor pattern becomes too long. This lowers the responsiveness of the touch panel. When a relatively high frequency is set for the drive pulse signal, the pulse width becomes too small. This lowers the detection accuracy of the touch panel.

SUMMARY OF THE INVENTION

One aspect of the present invention is a touch input device including a touch panel, a controller, and a cancellation electrode. The touch panel includes a sensor pattern and an operation surface arranged above the sensor pattern. The sensor pattern includes first electrodes and second electrodes insulated from one another and arranged in a grid. The controller applies a drive pulse signal to the sensor pattern and detects a touch location where the operation surface of the touch panel is touched based on changes in capacitance of the sensor pattern. A cancellation pulse signal is applied to the cancellation electrode during application of the drive pulse signal. The cancellation pulse signal has a phase inverted from that of the drive pulse signal.

BRIEF DESCRIPTION OF THE DRAWINGS

The invention, together with objects and advantages thereof, may best be understood by reference to the following description of the presently preferred embodiments together with the accompanying drawings in which:

FIG. 5A is a waveform diagram of a drive pulse signal;

FIG. 5B is a waveform diagram of a cancellation pulse signal;

FIG. 5C is a waveform diagram of an electric field formed around the touch panel (touch type input device);

DETAILED DESCRIPTION OF THE INVENTION

First Embodiment

A first embodiment of a touch input device will now be described with reference to the drawings.

Figure 1:
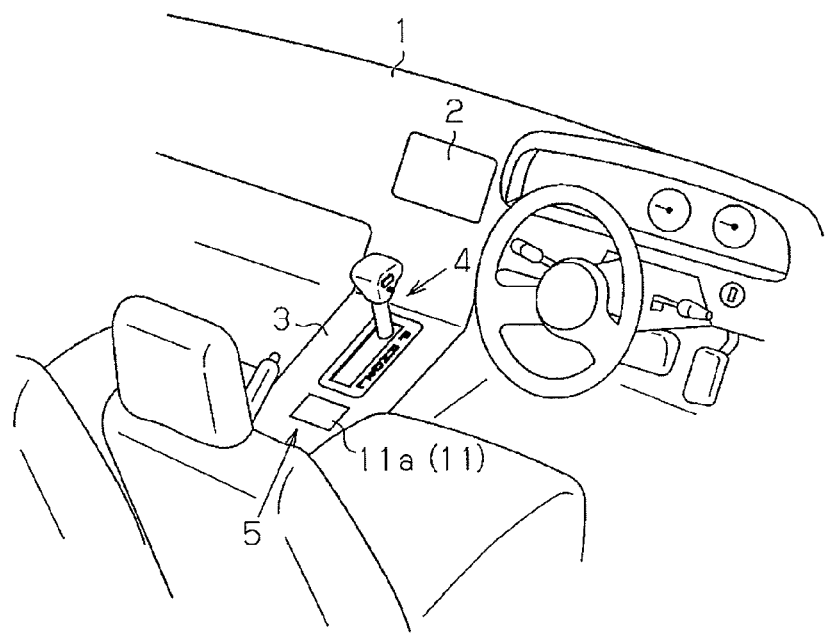
FIG. 1 is a perspective view of a touch type input device installed in a vehicle.

Referring to FIG. 1, a display 2 is arranged in a central portion of a dashboard 1. A center console 3 includes a shift lever 4. A touch panel 11 of a touch type input device 5 is located at the rear of the shift lever 4 on the center console 3. The touch panel 11 includes an operation surface 11a exposed from the center console 3. The operation surface 11a may be rectangular and substantially similar to the display 2. A user touches the touch panel 11 with a conductor, such as a finger or a stylus, to select and enter a desired functional item shown on the display 2 and so that an onboard device, such as an air conditioner or a car navigation system performs a desired operation.

Figure 2:
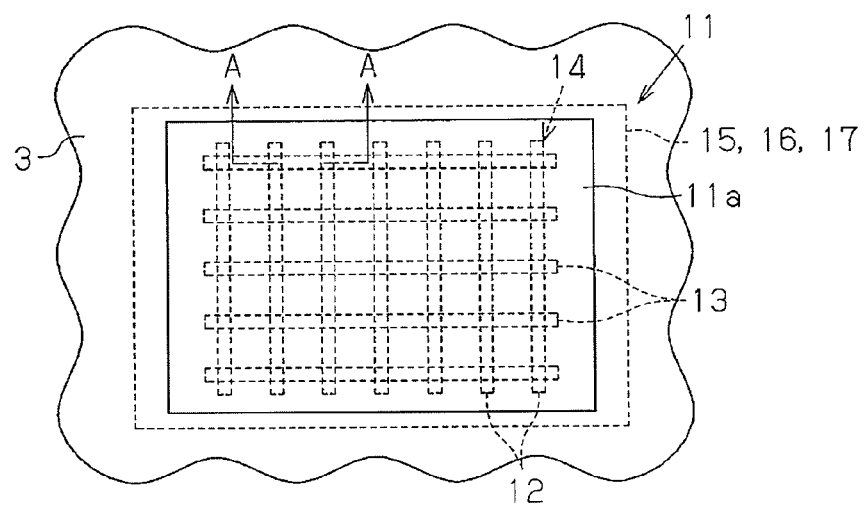
FIG. 2 is a plan view showing an operation surface of a touch panel on a center console in a first embodiment.
Figure 3:
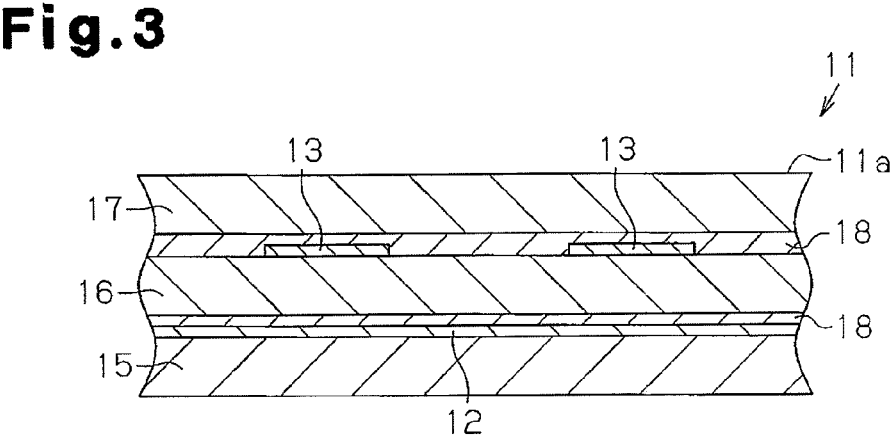
FIG. 3 is a partial cross-sectional view of the touch panel taken along line A-A in FIG. 2.

Referring to FIGS. 2 and 3, the touch panel 11 includes first electrodes 12 and second electrodes 13 that are insulated from one another and arranged in a grid to form a sensor pattern 14. For the sake of convenience, FIG. 2 shows only seven of the first electrodes 12 and five of the second electrodes 13.

More specifically, the touch panel 11 includes a first substrate 15, a second substrate 16, and a cover 17. The first electrodes 12 are arranged on the first substrate 15. The second electrodes 13 are arranged on the second substrate 16, which is located above the first substrate 15. The cover 17 is located above the second substrate 16. The first substrate 15, the second substrate 16, and the cover 17 are formed from an insulative material. Further, the first substrate 15, the second substrate 16, and the cover 17 are rectangular and larger than the operation surface 11a. The operation surface 11a of the touch panel 11 is formed by a portion of an upper surface of the cover 17.

The first and second electrodes 12 and 13 are, for example, strips of conductive material. The first electrodes 12 are parallel to one another and extend in one direction (X direction) within a range opposing the operation surface 11a on the first substrate 15. The second electrodes 13 are parallel to one another and extend in a direction (Y direction) orthogonal to the X direction within a range opposing the operation surface 11a on the first substrate 15. In this manner, the first electrodes 12 and the second electrodes 13 form a grid defining the sensor pattern 14 in the operation surface 11a. A capacitor is formed at each intersection of the first electrodes 12 and the second electrodes 13. In the present embodiment, an adhesive agent 18 fixes the first and second electrodes 12 and 13 to the first and second substrates 15 and 16.

Figure 4:
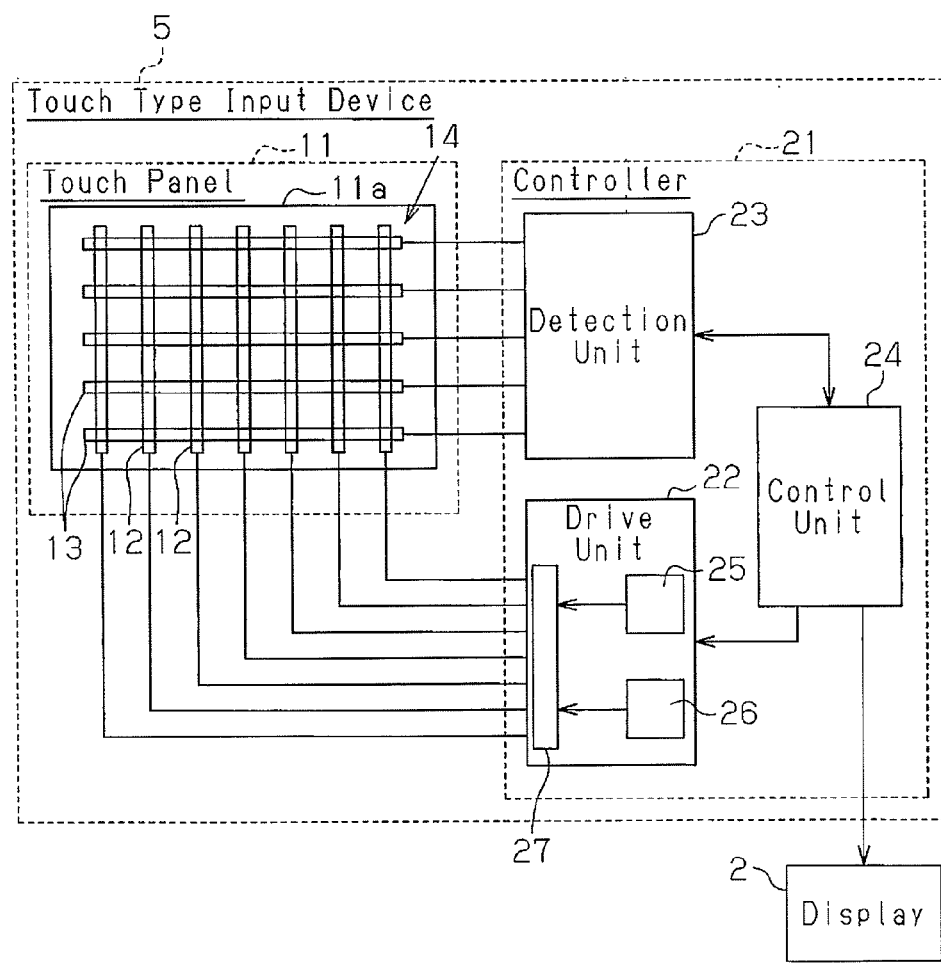
FIG. 4 is a block diagram of the touch type input device of the first embodiment.

Referring to FIG. 4, the touch type input device 5 includes the touch panel 11 and a controller 21. The controller 21 applies a drive pulse signal to the sensor pattern 14 to detect the location where the operation surface 11a was touched by a conductor. The controller 21 of the present embodiment is of a mutual capacitance type that detects the touch location based on charge-discharge current generated when changes occur in the capacitance of the capacitor formed at each intersection.

More specifically, the controller 21 includes a drive unit 22 connected to the first electrodes 12 (drive electrodes), a detection unit 23 connected to the second electrodes 13 (sensor electrodes), and a control unit 24 that controls the operation of the drive unit 22 and the detection unit 23. The drive unit 22 includes a drive pulse generator 25 that generates a drive pulse signal. The drive unit 22 generates a drive pulse signal (FIG. 5A) having a predetermined frequency based on a control signal from the control unit 24, selects the first electrodes 12 one at a time, and sequentially applies the drive pulse signal to each of the selected first electrodes 12. The detection unit 23 selects the second electrodes 13 one at a time based on a control signal from the control unit 24 and receives a charge-discharge current flowing to the selected second electrode 13 as an output signal in accordance with the drive pulse signal sequentially applied to each of the selected first electrodes 12. Further, the detection unit 23 detects changes in the capacitance for each capacitor based on the output signal. Then, the control unit 24 detects a touch location based on the detection signal and provides the detection result to the display 2.

When a drive pulse signal is applied to the first electrodes 12, an electric field formed around the touch panel 11 (touch type input device 5) cyclically changes in correspondence with the frequency of the drive pulse signal. The changes in the electric field produce the radiation noise that may affect a device (e.g., cell phone) arranged near the touch panel 11.

In this respect, when applying a drive pulse signal to the selected first electrode 12, the controller 21 applies a cancellation pulse signal to one of the other first electrodes 12 that was not selected. The drive pulse signal and the cancellation pulse signal have inverse phases. Accordingly, in the present embodiment, the other one of the first electrodes 12 to which the drive pulse signal is not applied functions as a cancellation electrode that extends parallel to the selected first electrode 12.

More specifically, referring to FIG. 4, in addition to the drive pulse generator 25, the drive unit 22 includes a cancellation pulse generator 26, which generates the cancellation pulse signal, and a switch 27, which switches between connection of the drive pulse generator 25 to the first electrodes 12 and connection of the cancellation pulse generator 26 to the first electrodes 12. This allows for the drive unit 22 to apply a drive pulse signal or a cancellation pulse signal to each first electrode 12. When applying a drive pulse signal to the first electrode 12 selected based on a control signal from the control unit 24, the drive unit 22 applies a cancellation pulse signal to an arbitrary one of the first electrodes 12 to which the drive pulse signal is not applied.

As shown in FIGS. 5A and 5B, the drive pulse signal and the cancellation pulse signal have the same frequency, the same pulse width, and the same amplitude but have inverse phases. That is, the cancellation pulse signal falls to a low (L) level when the drive pulse signal rises to a high (H) level and rises to a high (H) level when the drive pulse signal falls to a low (L) level.

The operation of the touch type input device of the present embodiment will now be described.

When a drive pulse signal is applied to the selected first electrode 12, a cancellation pulse signal is applied to a first electrode 12 to which the drive pulse signal is not applied. This forms an electric field corresponding to the cancellation pulse signal around the touch panel 11 in addition to the electric field corresponding to the drive pulse signal. As shown in FIGS. 5A and 5B, the cancellation pulse signal and the drive pulse signal have inverse phases. Changes in the electric field corresponding to the drive pulse signal are inverted from changes in the electric field corresponding to the cancellation pulse signal. Consequently, referring to FIG. 5C, as a whole, changes in the electric field formed around the touch panel 11 are small. This reduces the radiation noise.

The first embodiment has the advantages described below.

(1) During the application of a drive pulse signal, a cancellation pulse signal having a phase inverted from that of the drive pulse signal is applied to reduce the radiation noise. This allows for the reduction of the radiation noise without lowering the detection accuracy and responsiveness. In this regard, the first embodiment differs from a structure that uses, for example, a low-pass filter to change the waveform of the drive pulse signal.

(2) The controller 21 applies a cancellation pulse signal to one of the first electrodes to which a drive pulse signal is not applied. Thus, there is no need for a cancellation electrode that may enlarge the touch panel 11.

(3) The first electrode 12 functions as a cancellation electrode. This means that a cancellation electrode is arranged parallel to the first electrodes 12. For example, if the difference in the distances between the cancellation electrode and the first electrodes 12 were to be small such as when the cancellation electrode is arranged perpendicular to the first electrodes 12, the output signal provided from each second electrode 13 may slightly change when a conductor approaches regardless of whether or not the operation surface 11a is touched. In this regard, by arranging the cancellation electrode parallel to the first electrodes 12 like in the first embodiments, the influence of the cancellation electrode on output signals may be reduced without lowering the detection accuracy.

Second Embodiment

A second embodiment of a touch type input device will now be described with reference to the drawings. To avoid redundancy, like or same reference numerals are given to those components that are the same as the corresponding components of the first embodiment. Such components will not be described.

Figure 6:
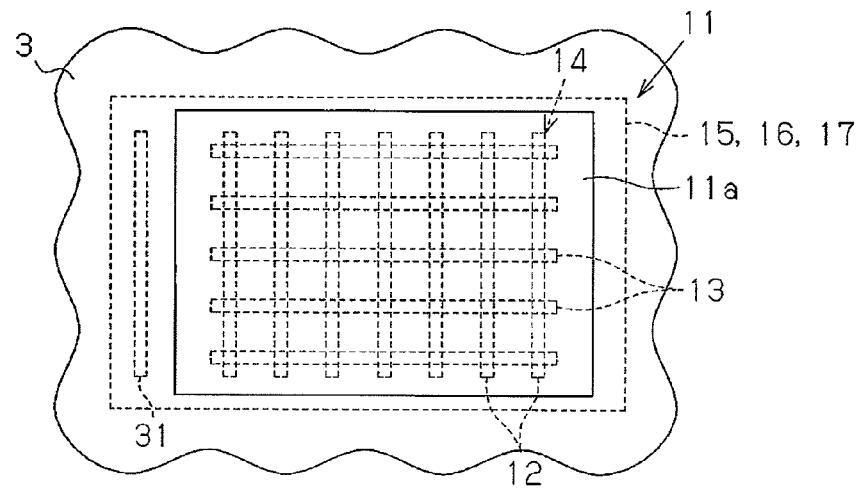
FIG. 6 is a plan view showing an operation surface of a touch panel on a center console in a second embodiment.

Referring to FIG. 6, a cancellation electrode 31, which is formed from a strip of conductive material, is arranged in the touch panel 11 adjacent to a region (sensor pattern 14) opposing the operation surface 11a. The cancellation electrode 31 is discrete from the first and second electrodes 12 and 13. The cancellation electrode 31 is arranged parallel to the first electrodes 12. Further, the cancellation electrode 31 of the second embodiment is arranged on the first substrate 15.

Figure 7:
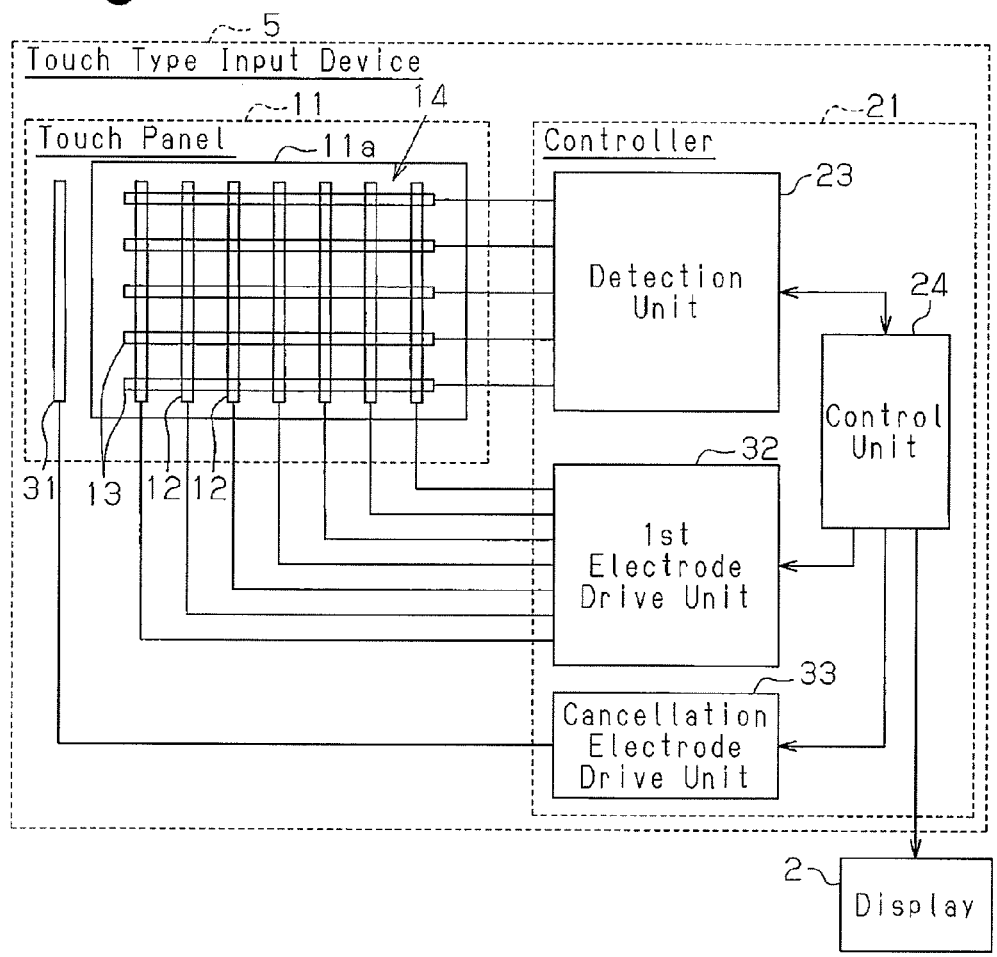
FIG. 7 is a block diagram of a touch type input device in the second embodiment.

Referring to FIG. 7, in addition to the detection unit 23 and the control unit 24, the controller 21 includes a first electrode driver 32 and a cancellation electrode driver 33. Based on a control signal from the control unit 24, the first electrode driver 32 generates a drive pulse single (refer to FIG. 5A), selects the first electrodes 12 one at a time, and sequentially applies the drive pulse signal to each of the selected first electrodes 12. Based on a control signal from the control unit 24, the cancellation electrode driver 33 generates a cancellation pulse signal (refer to FIG. 5B) and applies the cancellation pulse signal to the cancellation electrode 31 whenever a drive pulse signal is applied to the first electrode 12.

Since the cancellation pulse signal is applied to the cancellation electrode 31 during the application of a drive pulse signal, the touch type input device 5 of the second embodiment operates in the same manner as that of the first embodiment.

In addition to advantages (1) and (3) of the first embodiment, the second embodiment has the following advantage.

(4) Due to the cancellation electrode 31, a cancellation pulse signal does not have to be applied to the first electrodes 12. Accordingly, the controller 21 does not have to be configured to switch between the drive pulse signal and the cancellation pulse signal that are applied to the first electrodes 12. This facilitates the internal configuration of the controller 21.

It should be apparent to those skilled in the art that the present invention may be embodied in many other specific forms without departing from the spirit or scope of the invention. Particularly, it should be understood that the present invention may be embodied in the following forms.

In the first embodiment, a first electrode 12 functions as a cancellation electrode so that the cancellation electrode is parallel to the first electrodes 12. Instead, a second electrode 13 may function as a cancellation electrode. That is, the cancellation electrode does not have to be parallel to the first electrodes 12. Further, in the second embodiment, for example, the cancellation electrode 31 may be arranged diagonal or perpendicular to the first electrodes 12.

In the second embodiment, the cancellation electrode 31 is arranged on the first substrate 15. Instead, the cancellation electrode 31 may be arranged on, for example, the second substrate 16 or on a substrate discrete from the first and second substrates 15 and 16.

In each of the above embodiments, the cancellation pulse signal and the drive pulse signal have the same amplitude. Instead, the cancellation pulse signal may have a larger amplitude or smaller amplitude than the drive pulse signal.

In each of the above embodiments, the controller 21 is of a mutual capacitance type that detects the touch location. Instead, the controller 21 may be of, for example, a self-capacitance type that selects the first and second electrodes 12 and 13 one at a time, applies a drove pulse signal to the selected electrode, and detects a touch location based on changes in the capacitance of each selected capacitor.

The present examples and embodiments are to be considered as illustrative and not restrictive, and the invention is not to be limited to the details given herein, but may be modified within the scope and equivalence of the appended claims.

The invention claimed is:

1. A touch input device comprising:

a touch panel including a sensor pattern and an operation surface arranged above the sensor pattern, wherein the sensor pattern consists of first electrodes and second electrodes insulated from one another and arranged in a grid, wherein the first electrodes intersect with the second electrodes;

a controller that includes a first electrode driver and a cancellation electrode driver, wherein the first electrode driver applies a drive pulse signal sequentially to each of the first electrodes of the sensor pattern and detects a touch location where the operation surface of the touch panel is touched based on changes in capacitance of the sensor pattern according to the drive pulse signal; and a cancellation electrode to which the cancellation electrode driver applies a cancellation pulse signal with the same amplitude as the drive pulse signal, during application of the drive pulse signal such that the cancellation pulse is applied to the cancellation electrode each time the drive pulse signal is applied to each of the first electrodes of the sensor pattern, wherein the cancellation pulse signal has a phase inverted from a phase of the drive pulse signal, wherein the cancellation electrode is a single electrode formed from a strip of conductive material arranged parallel to the first electrodes on the same substrate layer as the sensor pattern and the cancellation electrode is discrete from the first and second electrodes and is not overlapping the first electrodes and the second electrodes, wherein the cancellation electrode is located adjacent to the sensor pattern.

2. The touch input device according to claim 1, wherein the first electrode driver is connected to the first electrodes, and the cancellation electrode driver is connected to the cancellation electrode.

3. The touch input device according to claim 1, wherein the controller detects a touch location based on an output signal indicative of changes in capacitance provided from the second electrodes in accordance with the drive pulse signal.

* * * * *